United States Patent Office 2,900,999
Patented Aug. 25, 1959

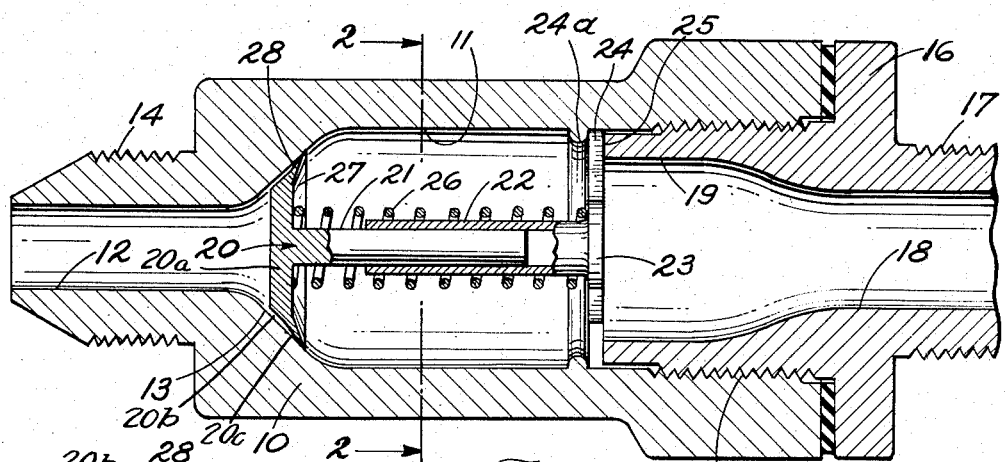
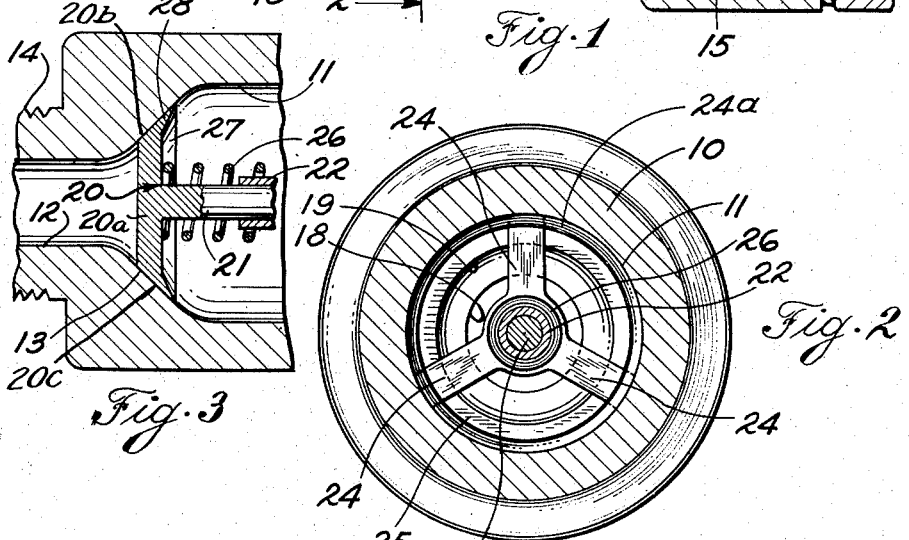
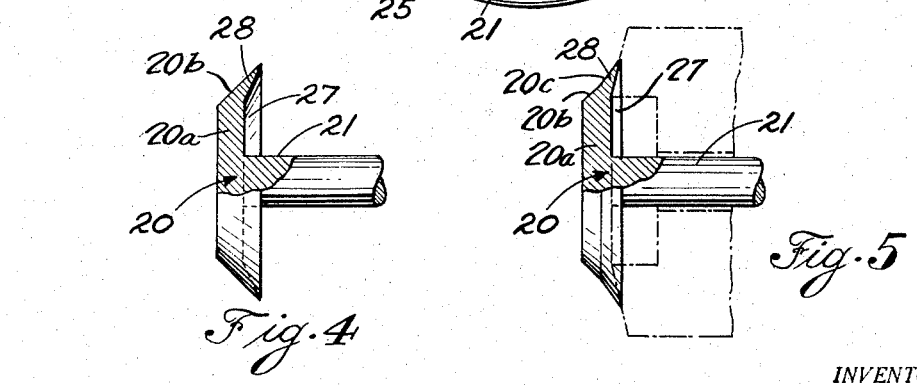
Aug. 25, 1959 L. B. COURTOT 2,900,999
VALVE SEAL
Filed July 21, 1955
INVENTOR.
LOUIS B. COURTOT
BY
RICHEY, WATTS, EDGERTON & McNENNY
ATTORNEYS

2,900,999

VALVE SEAL

Louis B. Courtot, Euclid, Ohio, assignor to The Weatherhead Company, Cleveland, Ohio, a corporation of Ohio Application July 21, 1955, Serial No. 523,589

1 Claim. (Cl. 137—516.25)

This invention relates to a metallic seal for conical valves and a method of making same, and more particularly to an improved valve poppet for annular check valves and the like.

In seating valve poppets, it is customary to provide a compound seat or poppet incorporating relatively soft sealing material. Such material may be unsatisfactory, as the fluid to be valved may be harmful to the packing or the fluid may be at elevated temperatures or both. Lapped metal to metal valve seats are known and used, but these require extensive and elaborate preparation.

An object of my invention is to provide an improved valve poppet. A particular object of my invention is to eliminate rubber or leather packings which are adversely effected by fluids and high temperatures.

Another object of my invention is to provide a valve poppet for forming a seal in a valve seat progressively tighter with increased pressure.

Other objects and details of my invention are found in the description herein, and the drawings of which, Fig. 1 discloses my valve poppet in spring closed position in relation to a conical valve seat of a check valve;

Fig. 2 is a section taken at 2—2 of Fig. 1;

Fig. 3 shows the valve poppet in fully closed position in relation to the valve seat.

Fig. 4 shows the valve poppet as machined; and

Fig. 5 shows the flaring of the valve poppet.

Referring to the drawings, the valve illustrated in Figs. 1 to 3, inclusive includes a casing 10 having a main valve bore 11 joined to a reduced inlet bore 12, by a substantially conical seat 13. The casing is reduced and externally threaded as indicated at 14 at the inlet end to facilitate its attachment to a pipe or other receptacle. At its opposite end the casing 10 is internally threaded as indicated at 15 to receive a coupling nut 16. The coupling nut 16 preferably has a reduced outlet extension externally threaded as indicated at 17 to facilitate its connection to a pipe or the like. The nut 16 is formed internally with an outlet bore 18 which flares into an enlarged bore 19 for communication with the main valve bore 11.

A valve poppet 20 is reciprocably mounted in the valve bore in any desired manner. The valve poppet 20 is provided with an integral stem 21, slidably mounted in a sleeve 22. The sleeve 22 is integral with a triangular spider 23 having arms 24 engaging bore 11 and held against rearward axial movement in any desired manner as by abutting against forward edge 25 of the nut 16 and additionally secured by annular bead 24a. A valve closing spring 26 surrounds sleeve 22 and engages the front face of spider 23 and the bottom of dished out portion 27 of valve poppet 20 so as normally to urge the poppet 20 toward closed position and press the spider 23 against the forward edge 25 of nut 16.

The poppet 20 is normally seated against the conical seat 13 by the pressure of spring 26. Fluid pressure entering through the inlet bore 12 exceeding the force of the spring 26 moves the valve poppet axially rearward within the casing 10 and permits the flow of fluid between the poppet and the valve seat 13, through the spaces between the arms 24 of the spider 23 and out through the outlet bore 18. When the inlet pressure drops below the force of the spring 26, or when the fluid tends to flow from the outlet opening 18 to the inlet opening 12, the poppet 20 moves forwardly against the conical seat 13.

In Fig. 1 the valve poppet 20 is in a closed position as by the action of spring 26. The completed poppet is shown in Fig. 5 wherein poppet 20 has a head portion 20a having an outer conical surface 20b that substantially matches that of conical valve seat 13. Extending integrally from head portion 20a of the poppet is a resilient lip 28 substantially radially inwardly unsupported as seen by dished out portion 27. The resilient lip 28 has an outer generally conical surface 20c that has a greater vertex angle than that of the outer conical surface 20b of the head portion so that upon closing of the valve the edge of the lip 28 initially engages the valve seat 13 for closing the valve under spring pressure. If the fluid pressure tends to build up from outlet 18 toward inlet 12, the fluid pressure will act against the portion 27, to further seat poppet 20 in the conical valve seat 13 until conical surface 20b of the head portion is seated. Such closure of the valve is shown in Fig. 3, when the outer periphery of both the lip and the head portion of valve poppet 20 are in full engagement with the seat 13, as the resilient lip 28 has been forced radially inwardly by the combined influence of the spring and the increased flow pressure.

Upon reduction in pressure in bore 11 or upon increased pressure at inlet 12 the poppet 20 will be moved away from seat 13 and resilient lip 28 will again flare outwardly, as the deformation of lip 28 during seating is not enough to exceed the elastic limit of the metal lip.

Thus it will be seen that a valve poppet is provided with a resilient lip to provide a sealing surface and eliminates the need for rubber or leather packings for such valve sealing. The improved valve poppet being made preferably from stainless steel is not subject to attack by hydraulic fluids or elevated temperatures on the order of 600° F.

In Fig. 4, the valve poppet 20 is shown after it is machined with the stem 21 integral with the head portion. The resilient annular lip 28 is also integral with the head portion and forms a dished-out portion 27. The outer periphery of the head portion and the resilient lip 28 are machined so that the outer peripheries are in alignment in the same inclined plane. However, to provide the resilient annular progressively engageable sealing surface 20c for the valve poppet, lip 28 is flared outwardly of the head portion by a tool, as shown in Fig. 5. Alternatively the resilient lip 28 may be machined to form shown in the solid lines of Fig. 5.

After the flaring operation is can be seen that conical surface 20b of the head portion is no longer in alignment with the outwardly flared periphery 20c of annular lip 28, but rather an extreme obtuse angle is formed. Upon completing the flaring operation, the valve poppet may be lightly lapped into the seat 13. As the resilient annular lip 28 is substantially radially unsupported, it will return to its original flared position after the light lapped operation.

Thus I have provided a novel poppet having a resilient lip portion for progressively sealing the poppet in a conical valve seat as the spring and increased fluid pressure act on the dished out portion of the poppet there being a conical head portion that firmly backs up the poppet against extreme pressure after the lip has made full engagement with the conical seat.

Having completed a detailed description of an embodiment of my invention, I contemplate that the appended claim is determinative of the scope of my invention.

What is claimed is:

In a valve body having a bore therethrough, a conical valve seat formed as part of said bore, a single piece metallic valve poppet element including a stem, said valve poppet element having a head portion with an outer conical surface substantially complementary to that of said conical valve seat, said valve poppet element head portion having an annular resilient lip portion integral with said head portion and flaring outwardly therefrom, said lip portion having an outer generally conical surface having a vertex angle greater than that of said conical surface of said head portion, said lip portion having an inner surface that flares outwardly from said head portion and merges with said generally conical outer lip portion surface to render the lip portion flexible relative to said head portion, initial closure of said valve poppet causing engagement of the periphery of said lip portion with said conical valve seat, further closure of said valve poppet element causing progressive engagement of the outer conical surface of said lip portion with said valve seat which progressive engagement continues until the outer conical surface of said head portion of the valve poppet element engages said valve seat to thereby firmly prevent further closing motion of said valve poppet element.

References Cited in the file of this patent

UNITED STATES PATENTS

| | | |
|---|---|---|
| 1,191,481 | Scouille | July 18, 1916 |
| 1,514,233 | Searles | Nov. 4, 1924 |
| 1,679,779 | Oberhuber | Aug. 7, 1928 |
| 1,800,127 | Wilson | Apr. 7, 1931 |
| 2,257,209 | Wells | Sept. 30, 1941 |
| 2,603,446 | Harding | July 15, 1952 |

FOREIGN PATENTS

| | | |
|---|---|---|
| 2,529 | Great Britain | of 1896 |
| 286 | Great Britain | of 1904 |
| 144,437 | Australia | Dec. 10, 1951 |